Feb. 10, 1942.　　　K. A. KOBE　　　2,272,345
PROCESS OF DEHYDRATING SALTS
Filed Oct. 11, 1939　　　2 Sheets—Sheet 1

INVENTOR:
Kenneth A. Kobe
By G. H. Braddock
　Attorney

Feb. 10, 1942. K. A. KOBE 2,272,345
PROCESS OF DEHYDRATING SALTS
Filed Oct. 11, 1939 2 Sheets-Sheet 2

INVENTOR:
Kenneth A Kobe
By G. H. Braddock
Attorney

Patented Feb. 10, 1942

2,272,345

UNITED STATES PATENT OFFICE 2,272,345

PROCESS OF DEHYDRATING SALTS

Kenneth A. Kobe, Seattle, Wash.

Application October 11, 1939, Serial No. 298,970

6 Claims. (Cl. 23—121)

This invention relates to a process of and an apparatus for dehydrating salts, and has more direct reference to a process of and an apparatus for removing water of hydration from highly hydrated salts in some instances to give the anhydrous form of the salt and in some instances to give a form of the salt much less hydrated than the original hydrate. The principles of the invention may be applied to all types of salt hydrates except those which decompose at the dehydration temperature. The present disclosure is particularly useful in dehydrating those salts having a negative temperature coefficient of solubility, that is, an inverted solubility curve. Examples of salts with a positive or normal solubility curve are: $Cd(NO_3)_2 \cdot 4H_2O$; $CaCl_2 \cdot 6H_2O$; $MgSO_4 \cdot 7H_2O$; $ZnSO_4 \cdot 6H_2O$. Examples of salts with a negative or inverted solubility curve are: $Na_2SO_4 \cdot 10H_2O$; $Na_2CO_3 \cdot 10H_2O$; $MnSO_4 \cdot 4H_2O$; $FeSO_4 \cdot 7H_2O$. All of these salts are extensively used in industry and represent practical problems in dehydration.

Sodium sulfate decahydrate, or Glauber's salt, or mirabilite, occurs naturally in many deposits, or may be crystallized from natural brines by cooling and/or evaporating. Due to the high content of water in the hydrated salt, which is substantially 56 percent. water, it is much more economical to dehydrate the hydrated salt to the anhydrous form before shipping. At 32.4° C. sodium sulfate decahydrate melts, forming solid sodium sulfate and a saturated solution of the salt. If the temperature of the saturated solution is increased, additional solid sodium sulfate will precipitate from the solution, because the salt is less soluble at higher temperatures. That is, the salt is said to have an inverted solubility curve.

Sodium carbonate decahydrate, also known as sal soda, or washing soda, occurs naturally in many deposits, or may be crystallized from natural brines by cooling and/or evaporating. Although this salt finds a market, the percentage of water in the salt, substantially 63 percent., prevents its shipment for any great distance. At 32.96° C. sodium carbonate decahydrate melts to give solid sodium carbonate monohydrate and a saturated solution of the salt. On further heating of the saturated solution, additional sodium carbonate monohydrate precipitates from the solution, because the salt has an inverted solubility curve. It is not possible to dehydrate the sodium carbonate monohydrate to the anhydrous salt in the presence of the saturated solution as the transition temperature of the monohydrate to the anhydrous salt is above the boiling point of the saturated solution. The sodium carbonate monohydrate may be employed as such for various known uses, or the sodium carbonate monohydrate may be dehydrated in any ordinary or preferred way, as in a heated rotary kiln.

Other ordinary or common commercial hydrated salts are manganous sulfate, which usually exists as either the penta- or tetrahydrate, and ferrous sulfate heptahydrate. These salts, like the previously mentioned sodium sulfate decahydrate and sodium carbonate decahydrate, have definite transition temperatures at which a higher hydrated form melts to give a solid monohydrate or anhydrous salt and a saturated solution having an inverted solubility curve, and additional monohydrated or anhydrous salt precipitates from the solution when it is raised to a temperature higher than its transition temperature. The hydrated salts with a positive or normal solubility curve likewise possess transition temperatures at which the salt hydrate melts and is in equilibrium with an anhydrous salt or a hydrated form containing less water than the original hydrate. In some cases the less hydrated form is precipitated from solution when the original hydrate melts. In other cases the salt hydrate melts to form a homogeneous solution. The solubility of these salts with normal solubility curves increases with temperature so that no salt precipitates from solution when the temperature is increased. However, the anhydrous salt or less hydrated salt is precipitated from the solution when the solution becomes saturated by evaporation of water from the solution. Further evaporation of water continues the crystallization of the salt from solution.

A method heretofore in vogue for obtaining the anhydrous or monohydrated form of a salt having an inverted solubility curve from a hydrated form of the salt has been carried out by evaporating a saturated solution of the salt. Evaporators, especially tube evaporators, suitable to the purpose are well known and of many different types. The principle employed for evaporating the solution is the same in all evaporators. Heat is obtained as from condensing steam and is transferred from the steam to a metal evaporator tube in which the saturated solution is confined and from this metal evaporator tube to the saturated salt solution. The temperature of the film of saturated solution in contact with the metal tube is made to increase and thus the solubility of the salt is made to decrease, because of the inverted solubility curve of the salt. The salt precipitates or crystallizes out of the saturated solution onto the metal tube as a hard adherent scale. The formation of the film of scale continues to grow by crystallization from the solution, retards heat transfer and decreases the capacity of the evaporator. It is necessary frequently to shut down the evaporator, fill it with fresh water and dissolve out the scale formation from the tubes. Such is a time consuming operation and decreases the output of an evaporator system. Another disadvantage of evaporator systems is that they must employ a solution of the salt being dehydrated as the feed to the evaporators. Hence, when operating to obtain an anhydrous or monohydrated form of a salt from a hydrated form thereof by evaporation of a saturated solution of the salt, it is necessary as a part of the system to dissolve the hydrated crystals to form a solution.

Another method of dehydrating a hydrated salt having an inverted solubility curve which is well known and common, consists in placing the crystal of the hydrated salt into a rotary kiln in such manner that the crystal passes down the kiln countercurrent to the hot burner gases. Under these conditions the crystal melts and deposits solid salt, and the hot burner gases evaporate the water from the saturated solution. The salt deposited adheres very solidly to the walls of the rotary kiln and does not roll freely out of the kiln as the anhydrous salt. Many arrangements to overcome the difficulty just mentioned are in existence, but all of the arrangements include or possess serious disadvantages.

For salt hydrates where the salt has a normal solubility curve the disadvantages stated above also apply in the main. For evaporators, the salt hydrate must be dissolved in additional water to form a solution to feed the evaporators, thus increasing the amount of water to be evaporated. The use of the heated rotary kiln is usually unsuitable, for the salts form sticky masses that will not move through the kiln.

The present invention contemplates a new method of overcoming the disadvantages of the processes for the same general purpose of the prior art as hereinbefore briefly mentioned. Speaking generally, certain disadvantages of the prior art are inherent in the fact that there is a surface present to which the salt attaches itself from the saturated solution, and other disadvantages of the practices of the prior art exist because of the relatively great expense of carrying out the heretofore known methods of dehydrating a hydrated salt, and, in particular, those salts having a negative temperature coefficient of solubility, or inverted solubility curve.

An important object of the invention is the provision of a novel and improved method of and a novel and improved apparatus for dehydrating salts, particularly hydrated salts having inverted solubility curves, wherein heat will be applied to the salt being dehydrated in such manner that the salt crystal upon precipitation out of a solution of the salt will be deposited, in the main, clear of the apparatus introducing the heat into the solution. Stated negatively, the present object may be said to be to provide a method and apparatus as just mentioned, wherein the salt cannot crystallize out of the solution of the salt being dehydrated in any consequential quantity onto the heat transfer medium or metal surface of the device employed for the purpose of dehydrating the salt.

Another important object is the provision of a novel and improved method of and a novel and improved apparatus for dehydrating salts wherein the solid hydrated salt can be used as the starting material rather than a saturated solution of the salt as is necessary when employing tube evaporators for dehydrating salts.

And a further object is to provide a method of and an apparatus for dehydrating hydrated salts which will contemplate the introduction of the hydrated salt in the form of a solid into a saturated solution of said salt heated by electrical means to a temperature above the transition temperature of the hydrated salt, thus to produce the anhydrous or monohydrated form of the salt, as the case may be in some particular instance.

Additional objects and advantages of the invention will become apparent as the description thereof proceeds.

In the accompanying drawings forming a part of this specification,

Fig. 1 is a diagrammatic view illustrating the solubility curve of each of sodium sulfate, sodium carbonate, and manganese sulfate. In said Fig. 1 the lower portions of the sodium sulfate and sodium carbonate curves represent the portion in equilibrium with the decahydrate form, the points of inflection on the curves represent the transition temperatures and compositions, and the upper portions of the curves represent the portions in equilibrium with the less hydrated forms, as anhydrous salt for sodium sulfate, and monohydrate for sodium carbonate. The manganese sulfate curve represents the pentahydrate, then the tetrahydrate, then the monohydrate with the inverted solubility curve.

It has been discovered that when a solution of a hydrated salt to be dehydrated is placed between two conducting electrodes in contact with said solution and subjected to the action of an alternating current of low voltage and high amperage, that heating and evaporation of the water of said salt occurs without the attendant disadvantages inherent in processes or methods heretofore of commerce and above mentioned. The application of heat within the solution of a hydrated salt to be dehydrated by means of spaced apart conducting electrodes causes heat to be generated directly within the solution with attendant precipitation of anhydrous or monohydrated salt, and the salt which precipitates has no opportunity, in the main, to become formed as scale upon, or even reach, the material of the heat transfer medium employed in the practicing of the process of the invention. Instead, the crystallization of the anhydrous or monohydrated form of the salt from the solution thereof being dehydrated is within the interior of the solution of the salt itself, and precipitation of the anhydrous or monohydrated form of the salt occurs, for the most part, at locations spaced from the heat transfer medium, or walls of the apparatus employed to the accomplishment of the process. The passage of alternating current of high amperage through the solution is possible because the solution is a conductor of electricity. Due to the resistance of the solution heat is generated which is directly proportional to the resistance of the solution and the square of the current. The amount of heat liberated in the solution per second can be calculated from the formula $$q \text{ equals } 0.2387\, I^2R$$

or the formula $$q \text{ equals } 0.2387\, EI$$

where q equals calories produced per second.
I equals current flowing, amperes.
R equals resistance of the solution, ohms.
E equals applied voltage, volts.

This heat is liberated evenly throughout the solution, so that heating and boiling of the solution takes place because of heat liberated in each increment of volume of the solution. Thus the anhydrous or monohydrated salt is precipitated uniformly throughout the solution and has no opportunity, in the main, to form scale.

A description of different new and improved apparatuses for carrying out the steps of the novel process will make clear the features and characteristics of said process itself.

Figure 3:
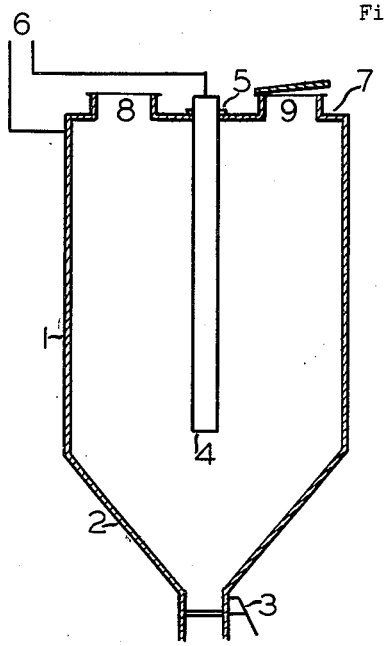
Fig. 3 is a diagrammatic view of an apparatus for carrying out the steps of the new and improved process.

With respect to Fig. 3 of the drawings, an upright tank, which may be considered as an evaporator tank, is denoted 1. This tank 1 may be constructed of any material suitable to its purpose which will not be corroded by the solution of the salt which is to be dehydrated. Stainless steel, for example, is entirely suitable. Other metals will be discussed with relation to electrode construction. The size of said tank 1 will depend upon the capacity of the plant, upon the ease or economy of construction, etc. The metal side and lower wall of the tank 1 acts as one of the electrodes through which alternating current is adapted to enter the salt solution. The other metal electrode is represented as 4. It enters the top of the tank through the insulating holder 5, and is in spaced relation to the metal side and lower wall of the tank. Alternating current is supplied to the metal electrodes 1 and 4 through a power line 6 from a source (not shown) of electrical energy. If the tank 1 is made circular, then the electrode 4 desirably may be cylindrical. If the tank 1 is made rectangular, then the electrode 4 desirably may be also rectangular. A series of electrodes may extend in depth so that the sections can be replaced easily. In Fig. 3, the tank 1 is disclosed as containing a single inside electrode. Said tank may be of any desired or convenient depth. The tank will possess sufficient diameter or width so that the salt solution between the electrode 4 and the electrode or tank 1 will have sufficient resistance to give the desired heating effect with the current and voltage selected to be applied.

The bottom 2 of the tank 1 may suitably be of V or cone shape when a circular central electrode is employed, and may end in a gate valve 3 through which the deposited solid salt may be withdrawn at intervals. A salt drum of ordinary or preferred construction may be employed to this purpose. In an instance where the tank 1 has considerable capacity, especially when constructed in rectangular section, it may be desirable that the bottom of said tank end in or meet a trough (not shown) with screw conveyor for carrying the precipitated salt to a side of the tank, where the salt can be more easily removed. Obviously, the bottom of the tank 1 need not be V or cone shape. Instead, a system of rakes as used in salt grainers may be employed to operate upon a flat floor of the tank and remove or withdraw precipitated crystals from said tank and floor.

The top 7 of the tank 1 may be of metal or of non-conducting material. In fact, it is preferable to construct said top 7 of wood or other non-conductor, since the central or inner electrode 4 enters through said top. The top 7 includes a vapor outlet 8 through which steam given off in the evaporation process is removed from the tank. A feed opening 9 also is included in the top of the tank and is for the purpose of introducing hydrated salt to solution within the tank.

Figure 4:
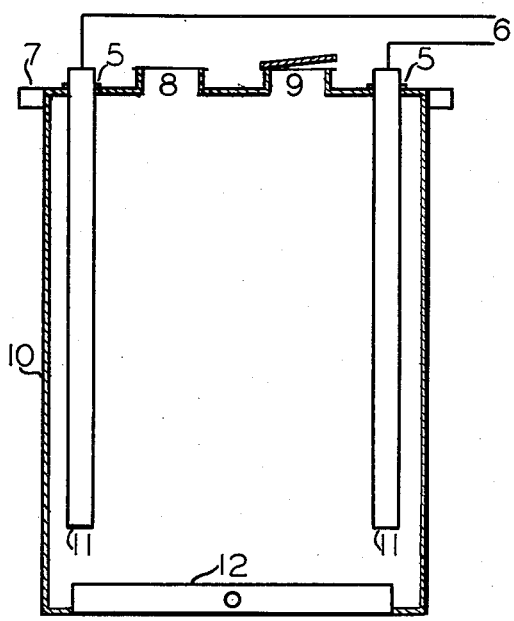
Fig. 4 is a diagrammatic view of another form of apparatus employing the principles of the invention.

With respect to Fig. 4 of the drawings, the tank 10 is constructed of non-conducting material, such as wood, ceramic material resistant to the salt, hard rubber or plastic material, or concrete. The horizontal cross-section of the tank 10 desirably may be rectangular and said tank may be of any depth to give a suitable and selected capacity. The width of the tank 10 will be sufficient so that satisfactory resistance in the solution can be provided between two spaced apart conducting electrodes 11 immersed in solution in said tank. The tank 10 is covered by a top 7 through which the conducting electrodes 11 enter. Said electrodes 11 are held in place by suitable holders 5, which will be of insulating material in any instance when the top 7 is of conducting material. Desirably, the top 7 will be of non-conducting material. It also includes a vapor outlet 8 and a salt hydrate feed opening 9. The electrodes 11 are connected with a source of alternating current by the power lines 6, as set forth in connection with the disclosure of Fig. 3. The length of the electrodes 11 may be slightly less than the depth of the tank 10, or, if said tank is inconveniently deep, said electrodes 11 may be made in shorter sections and connected in series. The bottom of the tank 10 is indicated as being flat with a system of rakes 12 as used in salt grainers to operate upon the flat floor and remove or withdraw the precipitated crystals from said tank and floor. Other types of construction previously described or mentioned could also be used, as a particular situation dictates or demands.

As previously stated, electric power delivered to the electrodes is alternating current. The frequency of this current may be that delivered by commercial power companies. Such frequency is usually 60 cycles and gives satisfactory operation. Sometimes 25 cycle power is available, which also will operate satisfactorily. Other frequencies, including high frequencies, may be employed. With alternating current the electrodes change from cathode to anode and back again to cathode with the changing frequency, so that continued electrolysis and accumulation of one product of electrolysis does not accumulate at one electrode, as is the case with direct current. Actually, any frequency of alternating current is satisfactory.

Figure 5:
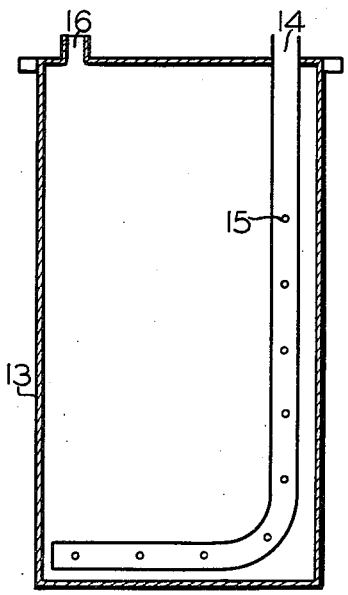
Fig. 5 is a diagrammatic view of an electrode for use in the apparatuses shown in Figs. 3 and 4.

The electrodes shown at 4 in Fig. 3 and 11 in Fig. 4 may be constructed of any suitable conductor which will not be corroded by the solution being evaporated. Stainless steel has been found to be entirely satisfactory with practically all solutions. With sodium sulfate, sodium carbonate and alkaline salts, cast iron has been found to be very satisfactory and may be preferred because of its smaller cost. Carbon is satisfactory in most cases, but because of its fragility metal electrodes are preferred. When evaporating salts with an inverted solubility curve, the electrodes tend to form scale. This is because the electrodes are at a slightly higher temperature than is the solution due to the power losses in the electrodes. Scale formation tends to increase the resistance of the electrodes and cut down the current passing through the solution and hence to decrease heating of the solution. Scale formation may be eliminated by employment of a construction of electrode as shown in Fig. 5. If the electrodes are cooled to a temperature slightly below that of the solution no scale will form on said electrodes. Cooling of the electrodes may be accomplished by employing hollow electrodes through which a suitable cooling fluid is circulated to remove the heat. The electrode of said Fig. 5 consists of a hollow shell 13 having a tube 14 entering through the top wall thereof. Said tube 14 suitably passes down one side of and across the bottom of the electrode or hollow shell 13, and is closed at its lower or inner end. The tube 14 includes perforations 15 through which the cooling fluid flows from said tube into the body of the electrode or hollow shell 13, takes up heat and passes out through another opening 16 in the top of said electrode or hollow shell. The cooling fluid may suitably be air, water, or other fluid.

The feed to the tank 1 in Fig. 3, or 10 in Fig. 4, may be a saturated solution of the salt, the solid salt hydrate, or the hydrated crystals suspended in saturated solution to give a slurry that can be pumped. The maximum thermal efficiency is obtained when the solid hydrated crystals are used as feed. Upon starting up, the substance in the tank 1 or 10 may be saturated solution alone, or a more or less dilute solution which will conduct electric current. The rate of feed is continuously maintained so that the liquid level remains substantially at a predetermined position. An evaporation of water occurs, solid salt is precipitated out of the solution and settles to the bottom of the tank from which it is removed.

From $Na_2SO_4.10H_2O$ the precipitated salt is anhydrous $Na_2SO_4$. From $Na_2CO_3.10H_2O$ is obtained $Na_2CO_3.H_2O$. From $MnSO_4.5H_2O$ and $MnSO_4.4H_2O$ is obtained $MnSO_4.H_2O$. From $FeSO_4.7H_2O$ is obtained $FeSO_4.H_2O$.

Figure 1:
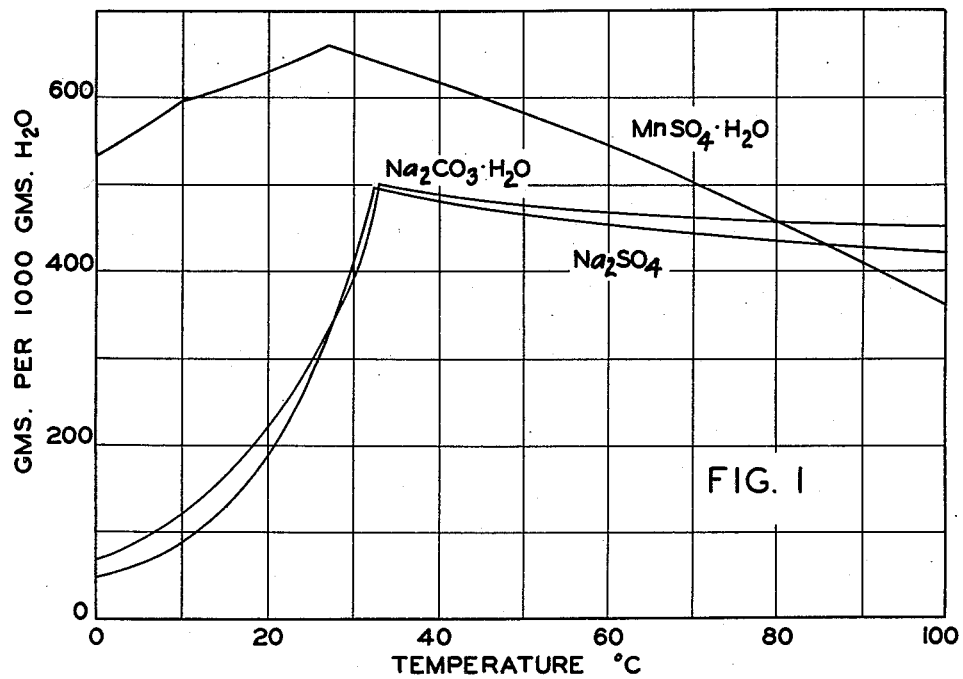
Figure 2:
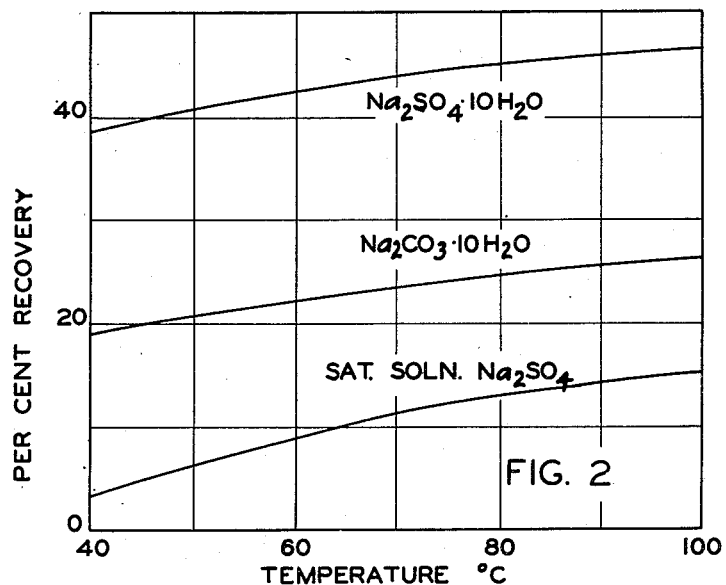
Fig. 2 is a diagrammatic view illustrating the percent. of recovery of sodium sulfate and sodium carbonate from their decahydrates, and of sodium sulfate from a saturated solution.

The recovery of anhydrous sodium sulfate, $Na_2SO_4$, is illustrated in Fig. 2 of the drawings. If a solution saturated with sodium sulfate at 32.4° C., the point of greatest solubility, is heated, sodium sulfate will precipitate out as the temperature rises. See Fig. 2 lower curve. If the solution is heated to 40° C., 2.8 percent of the sodium sulfate will be precipitated. If the temperature is raised to 100° C., 15.2 percent of the salt separates. The usual sodium sulfate brines available are saturated at outdoor temperatures and it is usually necessary to evaporate water at the boiling point of 103° C. before the solution becomes saturated. Thus, such a brine is not preferred as feed.

If the solid sodium sulfate decahydrate, $Na_2SO_4.10H_2O$, is heated, the recovery is much greater. See Fig. 2, upper curve. At 40° C. there is precipitated 38.9 percent. of the sodium sulfate which will be recovered as solid salt without the necessity of evaporating any water of hydration. At 100° C. there is precipitated 46.5 percent. of the sodium sulfate from the original sodium sulfate decahydrate.

Figure 6:
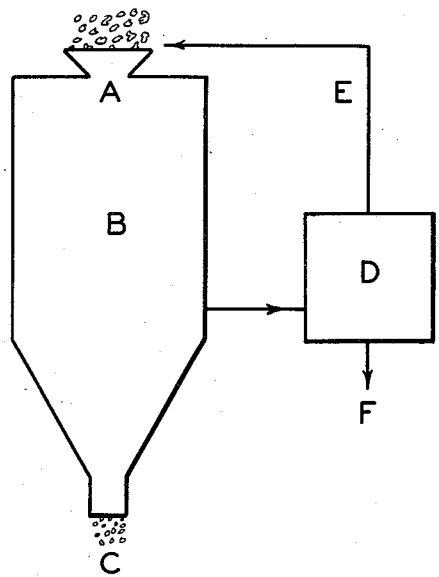
Fig. 6 is a diagrammatic view of a further modified construction by utilization of which the process of the invention can be carried out or practiced.

Anhydrous sodium sulfate can be obtained with considerable heat economy by employment of a cycle as illustrated in Fig. 6 of the drawings. In said cycle, sodium sulfate decahydrate is introduced at A into the tank B, equivalent to the tank 1 of Fig. 3, or the tank 10 of Fig. 4. In said tank B the sodium sulfate decahydrate is made to come into contact with a saturated solution of sodium sulfate at approximately 103° C., which is its boiling point under standard pressure. The decahydrate is heated to its transition temperature and melts, depositing anhydrous sodium sulfate, and the saturated solution is heated to 103° C., depositing more anhydrous sodium sulfate which is removed from the bottom C of the tank B to be centrifuged and completely dried. The saturated solution formed in the melting is removed to cooling tanks D where it is cooled by any suitable means. The tanks D may be constituted as one or more outdoor cooling ponds or refrigerated tanks for causing the saturated solution to be cooled. Cooling of the saturated solution results in recrystallization of sodium sulfate decahydrate which is removed and reintroduced into the tank B as suggested at E. The mother liquor from the recrystallization is discarded, as suggested at F, or placed in ponds for solar evaporation for recovery of all salt as sodium sulfate decahydrate. Introducing solid sodium sulfate decahydrate into the tank B at A and producing a melting and solubility effect at 103° C. in said tank will cause 46.5 percent. of anhydrous sodium sulfate to precipitate in the tank B for removal from the bottom C. The saturated solution in the tank will contain 53.5 percent. of the sodium sulfate introduced into said tank B. This is removed and crystallized as sodium sulfate decahydrate in the tanks D and then reintroduced into the tank B. If the temperature of the cooling tanks D is assumed to be 20° C., then 38.8 percent. of the sodium sulfate will recrystallize as the decahydrate and can be reintroduced at E. The solution drawn or at F will contain 14.7 percent. of the sodium sulfate in the original decahydrate. It will be seen that any residue resulting from the improved process of the invention will contain a much lower percentage of the valuable sodium sulfate than does the residue from processes heretofore known.

The amounts of heat necessary to the recovery of anhydrous sodium sulfate from sodium sulfate decahydrate by practicing the improved process of the invention and by practicing methods heretofore known have been calculated as follows:

Cal./g. $Na_2SO_4$
1. Heat required to heat sodium sulfate decahydrate from 20° C. to 32.4° C. and melt it_____ 385
2. Heat required to heat sodium sulfate decahydrate from 20° C. to 103° C. and melt it_____ 540
3. Heat required to heat sodium sulfate decahydrate from 20° C. and evaporate all water at 103° C_____ 949
4. Heat required to heat a solution saturated at 20° C. to 103° C. and evaporate all water_____ 3338

It is seen that the least amount of heat is required to be used when the sodium sulfate decahydrate is melted at its transition temperature of 32.4° C. and the solid sodium sulfate recovered. However, for practical reasons of operation it is preferable to heat the sodium sulfate decahydrate to the boiling temperature of 103° C. and recover the precipitated sodium sulfate. The saturated solution then may be cycled as shown in Fig. 6 of the drawings. Although more heat is required to evaporate all the water, 949 cal./g. instead of 540 cal./g., operating economy may dictate evaporation of all water rather than recycling. These things will be determined for the individual installation. It is seen that the heat required per gram of sodium sulfate precipitated to heat the decahydrate from 20° C. to 103° C. and evaporate all water is less than one third that required to heat a solution saturated at 20° C. to 103° C. and evaporate all water. Such fact discloses that the improved process employing decahydrate feed is far more efficient than is an evaporator operating on a solution of sodium sulfate.

Calculations of the amounts of heat necessary to the recovery of sodium carbonate monohydrate from sodium carbonate decahydrate, and to the recovery of other anhydrous or monohydrated salts from the more highly hydrated forms of the salts, would disclose efficiencies of the improved process similar to those shown when sodium sulfate decahydrate is the substance being dehydrated by employment of the principles of the invention.

When sodium carbonate decahydrate is introduced into a saturated solution of this salt at 40 C. and melted, 18.6 percent. of the sodium carbonate is precipitated out as sodium carbonate monohydrate. See Fig. 2, middle curve. If the temperature of the solution is increased to the boiling point, which is approximately 105° C. under normal barometric pressure, approximately 25 percent. of the sodium carbonate precipitates as monohydrate. When employing a cycle as in Fig. 6 wherein sodium carbonate decahydrate is introduced into a saturated solution of this salt in the tank B, approximately 25 percent. of the sodium carbonate so introduced will precipitate as sodium carbonate monohydrate and leave approximately 75 percent of the sodium carbonate in solution. In the cooling tanks D, when the temperature is reduced to approximately 20° C. then 61.3 percent. of the sodium carbonate will recrystallize as sodium carbonate decahydrate, to be recycled, and leave 13.7 percent. of the sodium carbonate to be withdrawn at F as part of the mother liquor. Compared to sodium sulfate decahydrate, sodium carbonate decahydrate will yield a smaller recovery per cycle, but less salt will remain in the mother liquor.

Although the data at hand are insufficient to calculate the amounts of heat necessary to the recovery of sodium carbonate monohydrate from sodium carbonate decahydrate by practicing the improved process and by practicing methods of the prior art, the same general conclusions mentioned above with respect to the recovery of anhydrous sodium sulfate from sodium sulfate decahydrate hold for the recovery of sodium carbonate monohydrate from sodium carbonate decahydrate. That is, the improved process is more efficient for the recovery of sodium carbonate monohydrate from sodium carbonate decahydrate than are processes heretofore known industrially.

In the instance of the disclosure as in Fig. 4, as well as in Fig. 3, the heat is liberated evenly throughout the solution, and the anhydrous or monohydrated salt is precipitated in the main within the solution. By far the major portion of the precipitated salt has no occasion to become formed as scale upon the conducting electrodes 4 or 11, the wall of the tank or conducting electrode 1, or the wall of the non-conducting tank 10.

What is claimed is:

1. The process of dehydrating sodium sulfate decahydrate, which comprises forming a saturated solution of sodium sulfate, heating and maintaining said saturated solution at a temperature above 32.4° C. by passing alternating current between electrodes placed in touch with the saturated solution below the surface thereof thus to cause said saturated solution to become heated by reason of its resistance, cooling at least one of said electrodes to a temperature below that of the saturated solution, and feeding sodium sulfate decahydrate into said saturated solution.

2. The process of dehydrating a hydrated salt having an inverted solubility curve, which comprises forming a saturated solution of the salt, heating and maintaining said saturated solution at a temperature above the transition temperature of the hydrated salt to a less hydrated form thereof by passing alternating current between electrodes placed in touch with the saturated solution below the surface thereof thus to cause said saturated solution to become heated by reason of its resistance, cooling at least one of said electrodes to a temperature below that of the saturated solution, and introducing the hydrated salt into the saturated solution.

3. The process of dehydrating a hydrated salt, which comprises forming a saturated solution of the salt, heating and maintaining said saturated solution at its boiling temperature by passing alternating current between electrodes placed in touch with the saturated solution below the surface thereof thus to cause said saturated solution to become heated by reason of its resistance, cooling at least one of said electrodes to a temperature below that of the saturated solution, removing precipitated dehydrated salt, and feeding into the heated saturated solution solid hydrated salt in such amount as to replace water vapor removed.

4. The process of dehydrating a hydrated salt having an inverted solubility curve, which comprises forming a saturated solution of the salt, heating and maintaining said saturated solution at its boiling temperature by passing alternating current between electrodes placed in touch with the saturated solution below the surface thereof thus to cause said saturated solution to become heated by reason of its resistance, cooling at least one of said electrodes to a temperature below that of the saturated solution, introducing solid hydrated salt into the heated saturated solution thus to cause said solid hydrated salt to become melted, removing precipitated dehydrated salt, and causing the introduction of solid hydrated salt into the heated saturated solution to be in such amount as to replace water vapor removed.

5. The process of dehydrating a hydrated salt having an inverted solubility curve, which comprises forming a saturated solution of the salt, heating and maintaining said saturated solution at a temperature above the transition temperature of the hydrated salt to a less hydrated form thereof by passing alternating current between electrodes placed in touch with the saturated solution below the surface thereof thus to cause said saturated solution to become heated by reason of its resistance, cooling at least one of said electrodes to a temperature below that of the saturated solution, feeding hydrate crystals into the heated saturated solution thus to cause said hydrate crystals to become melted, removing precipitated dehydrated crystals, and feeding hydrate crystals into the heated saturated solution in such amount as to replace water vapor removed.

6. The process of dehydrating sodium sulfate decahydrate, which comprises forming a saturated solution of sodium sulfate decahydrate, heating and maintaining said saturated solution at its boiling temperature by passing alternating current between electrodes placed in touch with the saturated solution below the surface thereof thus to cause said saturated solution to become heated by reason of its resistance, cooling at least one of said electrodes to a temperature below that of the saturated solution, introducing sodium sulfate decahydrate into the heated saturated solution thus to cause said sodium sulfate decahydrate to become melted, removing precipitated anhydrous sodium sulfate crystals, and introducing sodium sulfate decahydrate into the heated saturated solution in such amount as to replace water vapor removed.

KENNETH A. KOBE.